United States Patent [19]

Hensley

[11] Patent Number: 4,787,987

[45] Date of Patent: Nov. 29, 1988

[54] FILTER APPARATUS AND METHOD

[76] Inventor: Clifford J. Hensley, P.O. Box 6847, Odessa, Tex. 79762

[21] Appl. No.: 1,912

[22] Filed: Jan. 9, 1987

[51] Int. Cl.$^4$ .............................................. B01D 23/24
[52] U.S. Cl. .................................. 210/792; 210/807; 210/269; 210/290; 210/503
[58] Field of Search ................................ 210/792–796, 210/807, 269, 275–279, 286, 289, 291, 503, 106, 290

[56] References Cited

U.S. PATENT DOCUMENTS

| Re. 25,761 | 4/1965 | Hirs | 210/108 |
|---|---|---|---|
| 2,733,138 | 1/1956 | Clark | 51/303 |
| 3,550,774 | 12/1970 | Hirs | 210/67 |
| 3,557,955 | 1/1971 | Hirs | 210/67 |
| 3,737,039 | 6/1973 | Hirs | 210/792 |
| 3,780,861 | 12/1973 | Hirs | 210/80 |
| 3,992,291 | 11/1976 | Hirs | 210/23 R |
| 4,197,205 | 4/1980 | Hirs | 210/290 |
| 4,496,464 | 1/1985 | Hensley | 210/792 |

Primary Examiner—Ivars Cintins
Attorney, Agent, or Firm—Marcus L. Bates

[57] ABSTRACT

A filter device for removing contaminants from liquid flowing therethrough comprising a vessel having an inlet for providing a contaminated liquid flow into the interior thereof and an outlet through which filtered liquid can exit the vessel. A screen means contained within the vessel supports a filter media thereon. A pump has a suction and discharge located within the vessel and respective to the screen whereby the filter media can be fluidized and thereby cleaned without removing the media from the vessel. The scrubbing action transfers the contaminants from the filter media into the scrub water and thereby enables the contaminants to be removed from the vessel by discharging the scrub water therefrom.

24 Claims, 3 Drawing Sheets

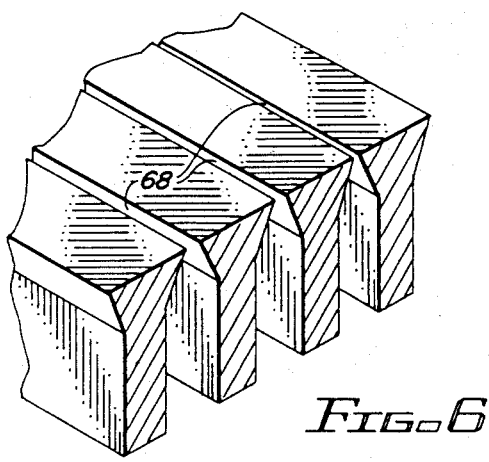
FIG. 6
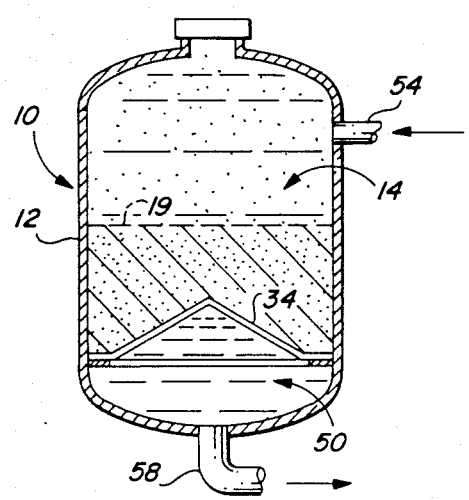
FIG. 8 FILTRATION
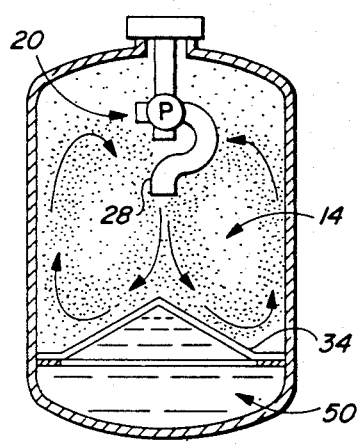
FIG. 9 FLUIDIZATION
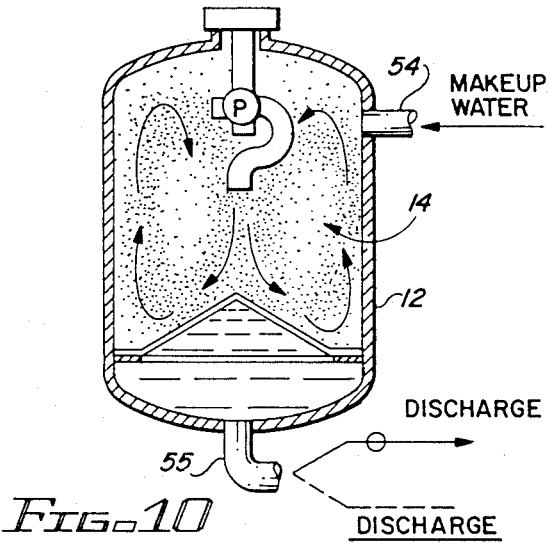
FIG. 10 DISCHARGE
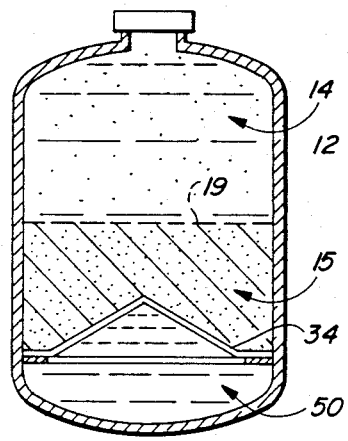
FIG. 11 SETTLING
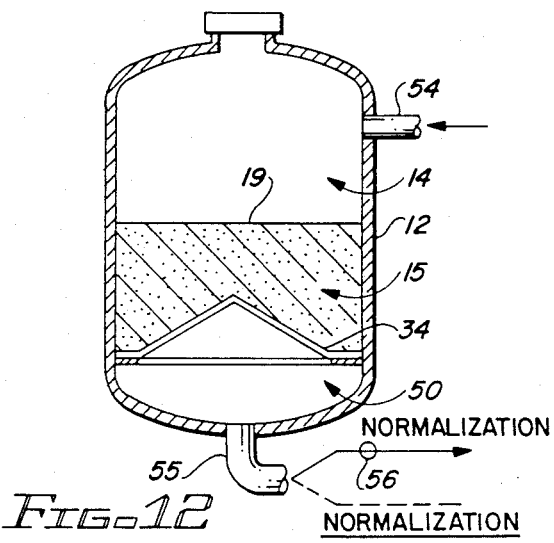
FIG. 12 NORMALIZATION

FILTER APPARATUS AND METHOD

REFERENCE TO RELATED PATENT APPLICATIONS

Reference is made to my prior U.S. Pat. No. 4,496,464 issued Jan. 29, 1985 and to the art cited therein.

BACKGROUND OF THE INVENTION

In my previous U.S. Pat. No. 4,496,464 issued Jan. 29, 1985, there is taught a filter system that includes a vessel having a filter media therein arranged such that the filter media can be scrubbed or rejuvenated within the vessel. This eliminates the costly supplemental vessels previously thought necessary for scrubbing or rejuvenating filter media. Other known filter systems involve translocating the media into a secondary vessel where the media is scrubbed and then returned into the primary vessel.

My above mentioned previous patent required that the filter media be supported on a first screen and that the scrubbing action occur in conjunction with a second screen means wherein the second screen means is located at the vortex of a toroidal flow pattern which is effected during the scrubbing action. The toroidal flow pattern in this previous patent is produced by a pump means having a suction and outlet arranged respective to one another and to the second screen means to produce a flow across the second screen means so that contaminants are scrubbed from the media, transferred into the water, and then the water and contaminants are forced through the second screen means and away from the vessel, leaving the scrubbed media within the vessel.

The present invention constitutes an improvement over my previous patent by the elimination of the second screen means, whereby one screen means supports the filter media and also provides an outlet for the scrub water rejuvenation of the media in a new and unobvious manner heretofore unknown to those skilled in the art.

A filter built in accordance with this invention is simple in design, low in cost, and efficient in operation. The filter of this invention is designed for filtration of dirty water containing primarily solids and low concentration oil, e.g. lake water, sea water, etc. For this particular filtration of dirty water, people today use the conventional sand filters because of their low cost as compared to a deep bed media filter. The purpose of this invention is to provide a novel filtration unit having a much more sophisticated and efficient technique than a sand filter.

SUMMARY OF THE INVENTION

This invention is to method and apparatus for filtering contaminants from a stream of fluid. The invention includes the employment of a screen mean which can be of various different geometrical configurations. The screen means is placed within a vessel in a manner to suitably support a filter media, wherein the media is made of a multiplicity of discreet pieces of filter material which substantially will not pass through the screen means.

During the filtering operation, contaminated liquid flows into the vessel, through the media, through the screen means that supports the media, and away from the vessel; while the contaminants are deposited on the media.

The media is periodically subjected to an operation wherein it is cleaned or rejuvenated whenever the accumulated contaminants have reached a magnitude which increase the pressure drop across the filter vessel to an unacceptable and predetermined value. The rejuvenation steps include a novel flow system that carries out the functions of fluidization, discharge, settling, and normalization.

The fluidization step is carried out by arranging a pump inlet and outlet within the vessel in a manner to form a toroidal flow path, with the screen means being included within the flow pattern such that flow must occur thereacross. The fluidization step scrubs the contaminants from the filter media by transferring the contaminants into the scrub water. This enables the subsequent discharge step to efficiently remove the contaminated water while make-up water flows into the vessel.

The vessel is then isolated a sufficient length of time to enable the cleaned media to settle into a filter bed, and thereafter a normalization step is carried out so that no contaminated water is present in the filter vessel. Filtration is then resumed until the pressure drop across the bed is again elevated to an unacceptable value.

Accordingly, a primary object of the present invention is the provision of method and apparatus for sequentially filtering with and then cleaning a filtering media which is used to filter a stream of liquid.

Another object of the invention is to provide method and apparatus by which a contaminated stream of liquid is filtered for one interval of time to provide separation of the contaminants and the liquid, and the filter media is then scrubbed clean in a new and unobvious manner during another interval of time, with the filtering step and cleaning step both occurring within the same enclosure.

A further object of this invention is to disclose and provide a method of filtering a stream of contaminated liquid by flowing the contaminated liquid into a vessel having a liquid space and a filter media space; whereupon, the contaminated liquid proceeds through the filter media, thereby leaving the contaminants within the media, so that clean, filtered liquid exits from the vessel; and, thereafter, the filter media is scrubbed without removing the media from the vessel.

A still further object of this invention is to provide an unusual and unobvious filter system having particles of filter media contained therein which filters contaminants from a flowing liquid, and wherein the filter media is occasionally scrubbed clear of contaminants, and the contaminants removed from the system, with both the scrubbing and filtering action occurring within the same vessel.

Still another object of the present invention is the provision of a filter device having a filter media supported by a screen wherein the filtrate travels through the screen, and wherein the filter media is subsequently scrubbed and the scrub water exits the vessel through the screen and to a point of discharge.

Another object of this invention is the provision of an improved filter apparatus that utilizes a mixture of walnut hulls and pecan hulls.

A further object is the provision of a filter media comprised of a pecan hulls, walnut hulls, and appricot hulls.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described herein.

BRIEF DESCRIPTION OF THE DRAWINGS

FIG. 6 is an enlarged, fragmentary, detail of part of the apparatus disclosed in FIGS. 1–5 and 7 and as indicated by numeral 6 of FIG. 3;

FIGS. 8–12 are part diagrammatical, part schematical, part cross-sectional views which set forth various stages of operation of the present invention.

DETAILED DESCRIPTION OF THE PREFERRED EMBODIMENTS

Figure 1:
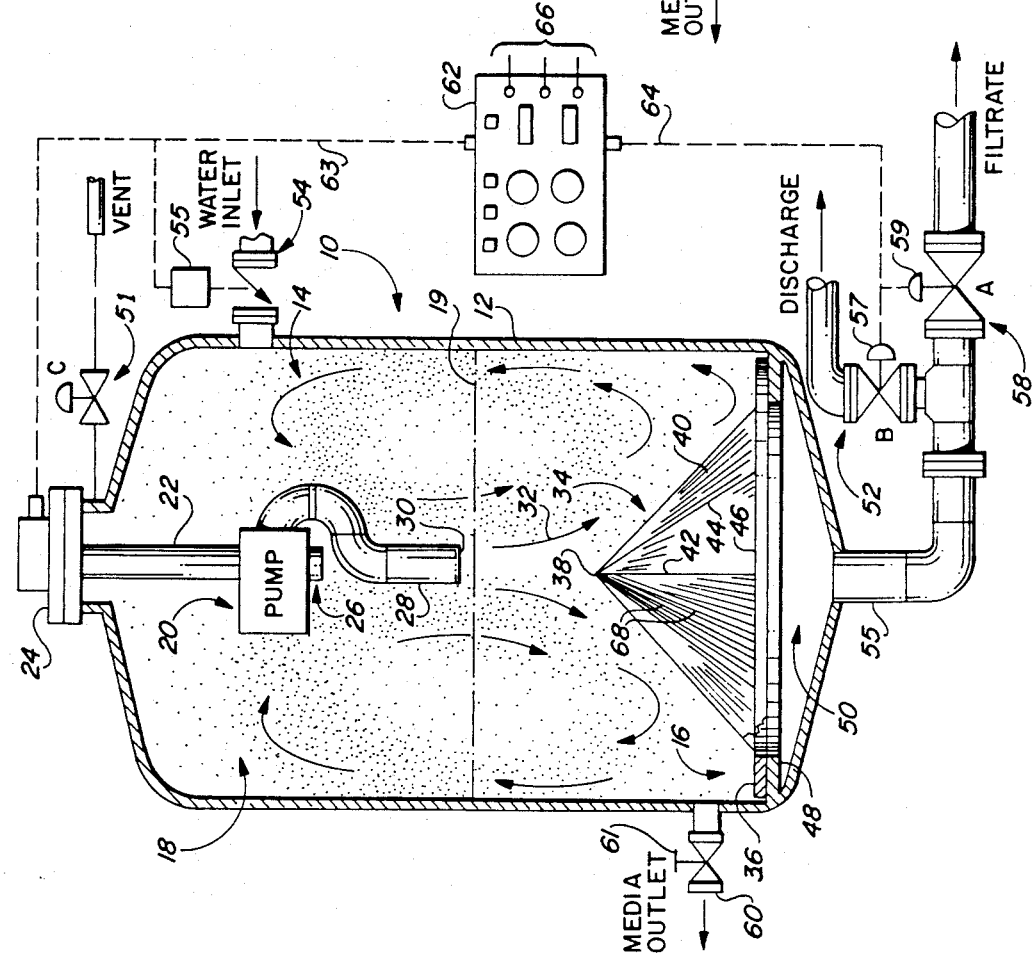
FIG. 1 is an elevational, part diagrammatical, part cross-sectional view of a filter apparatus and method made in accordance with the present invention.

In the figures of the drawings, and in particular FIG. 1, there is disclosed a filter system 10 made in accordance with the present invention. The system 10 includes a vessel 12 that forms an enclosure 14. The enclosure 14 can be referred to as the lower enclosure 16 and the upper enclosure 18. A pump assembly 20, which can take on several different forms, includes a support 22 by which the pump 20 is suspended from a manhole assembly 24 located at the upper terminal end of the vessel.

The pump 20 includes a suction 26 and a nozzle 28. The nozzle has an outlet 30. The outlet 30 of the nozzle is shown spaced above and perpendicularly disposed respective to a fill-line 19 of the filter media; however, the outlet can be located at other elevations respective to the fill-line 19 if desired.

The arrows at numeral 32 indicate a toroidal flow pattern with the nozzle 28 being located at the center of the toroid. The toroidal flow pattern is effected by fluid flow into suction 26 and fluid flow from the nozzle outlet 30.

A screen means 34, which can take on several different forms, is located in the lower enclosure. The lower circumferentially extending edge of the screen 34 terminates in attached relationship respective to attachment flange 36. The screen 34 includes an apex 38 which is axially aligned with the nozzle 28 and suction 26. The screen means 34 is made of a plurality of individual elements 40 which are made triangular in form and have adjacent opposite sides 42, 44; a base 46; and, a common apex 38. The sides 42, 44 are attached to one another while the base 46 is attached to flange 36. The flange 36 is supported by means of the illustrated lower flange 48 that is attached to the outer shell 12 that forms enclosure 14.

The screen 34 separates the lower chamber 16 into a filtrate chamber 50 and leaves ample space for the filter bed as indicated by fill-line 19. This arrangement also provides ample space at upper enclosure 18 for a dirty water chamber. As disclosed in FIG. 1, the filter bed is in the act of being scrubbed or rejuvenated and therefore has been fluidized and is flowing in a toroidal flow path.

Discharge valve 52 is connected to an appropriate disposal facility for disposing of dirty water, except in those instances where the contaminant is of a value, whereupon valve 52 would be connected to a collection and holding facility.

Valve 51 removes compressible fluid from the uppermost end of the upper enclosure 18.

Water inlet 54 is connected to enable the vessel to receive the contaminated liquid that must be filtered. Filtrate valve 58 is connected to provide a flow path for the clean filtered water. Valve 60 provides a convenient means by which all of the filter media can be removed from the enclosure 14 when it is desired to renew the filter media. The filtrate chamber 50 is connected to pipe 55 which in turn is connected to the tee that accepts valves 52 and 58.

A computerized control panel 62 provides intelligence and sends appropriate signals along conduits 63 and 64 for actuating valves 52, 54, and 58, and for controlling the action of pump 20 in a logical, predetermined, sequence. Numerals 55, 57, and 59 indicate a control device for actuating the valves 54, 52, and 58. Numeral 66 indicates power input into the control panel 62.

Figure 2:
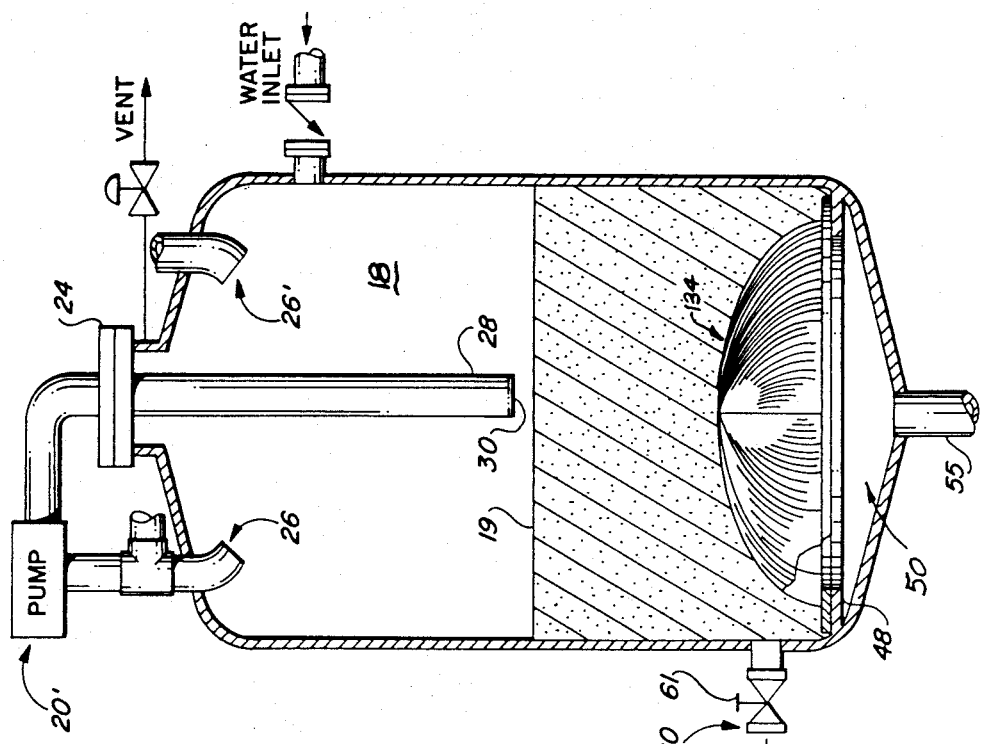
FIG. 2 is an elevational, part cross-sectional, side view of another embodiment of the present invention.

In the embodiment of the invention set forth in FIG. 2, the settled filter media is shown supported within the lower enclosure 16 with screen 134 separating the media from the filtrate chamber 50, and with the filter media separating the liquid contained within the upper enclosure 18 from the screen 134.

The pump 20' is located externally of the vessel and includes suctions 26, 26' symmetrically supported within the upper end of the vessel and aligned with the toroidal flow path 32 of FIG. 1. The nozzle 28 extends axially down through the manhole 24 and terminates at outlet 30 and in proximity of the fill-line 19. The filtrate exits at 55 and to the valves 52, 58 (not shown).

Figure 3:
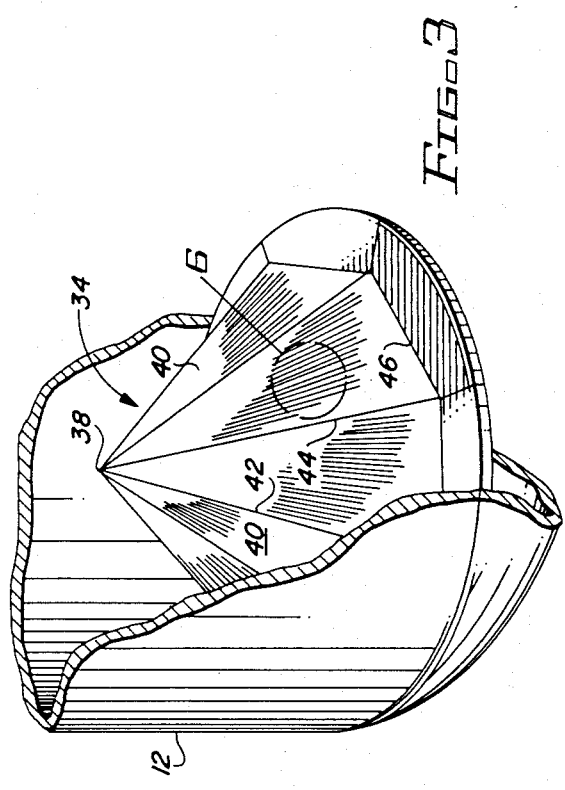
FIG. 3 is a fragmentary, perspective view which sets forth the details of part of the present invention.
Figure 4:
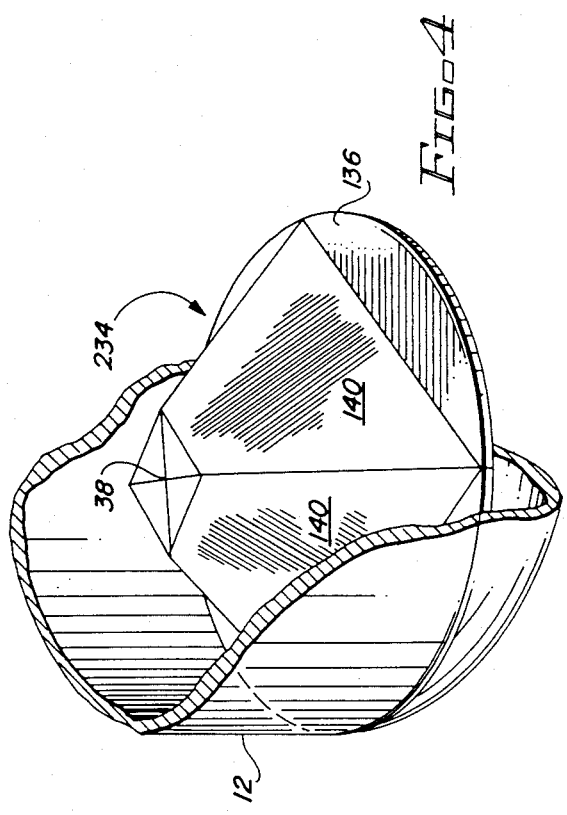

FIGS. 3, 4, 5, and 7 disclose various different configurations of the screen means 34 of FIG. 1. In FIGS. 1 and 3, the screen means are quite similar. In FIG. 4, the screen means is a truncated pyramid having sides 140 with there being an axis 38 of the pyramid.

Figure 5:
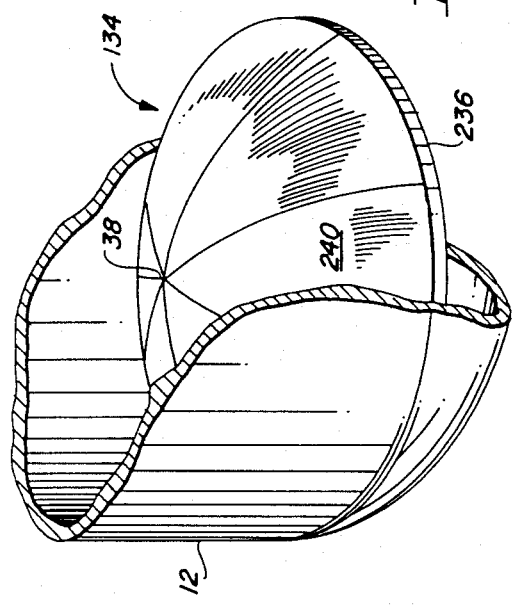
FIGS. 4, 5, and 7 are perspective, fragmentary, detailed views which set forth several different embodiments of this invention.
Figure 7:
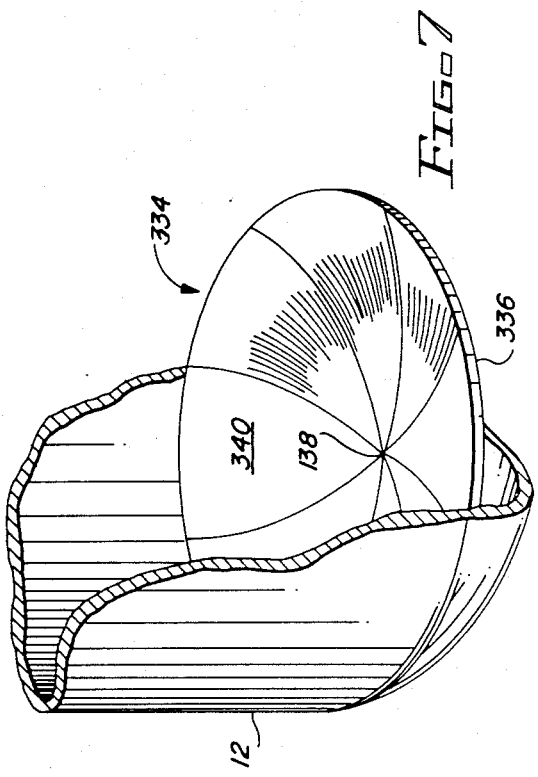

FIG. 7 illustrates the filter of FIG. 5 inverted. In FIGS. 5 and 7, the hemispherical filter means is preferably made into the illustrated segments 240 and 340, respectively.

FIG. 6 is an enlarged, detailed view showing the construction of the screen means 34. The screen means of FIG. 6 is preferably wedge wire plate members made of ⅛ inch thick bars set on centers to provide 0.015 a inch slot between adjacent bars. This type construction is commercially available and is referred to as a wedge-type screen. FIGS. 8–12 set forth the operation of the apparatus disclosed in FIGS. 1 and 2.

The equipment for the apparatus is minimized, so as to keep costs and complexity to a minimum. The filtration unit of FIG. 1 consists of one fluidization pump which is submerged down into the top of the vessel with an easily accessible manway; or, as seen in FIG. 2, an external pump with a discharge into the center of the vessel; and, one wire screen which, in FIG. 1, is conically shaped (i.e. tee-pee) and welded or otherwise fixed around the inside bottom of the vessel, one inlet pipe leading to the upper end of the vessel comprising a simple "check" valve, and only one outlet pipe which leads from the bottom center of the vessel comprising two actuated valves, one for the clean water and one for the discharge leading to the discharge tank.

The filter employs a much more efficient technique as compared to a sand filter. Rejuvenating the bed requires less time, 20 minutes or less, and produces much less water discharge volume than a comparable sand filter.

Filtration and Clean-up Sequence:

| 1. Filtration | 30 hours or less |
|---|---|
| 2. Fluidization | 15 seconds |
| 3. Discharge | 12 minutes under normal conditions |
| 4. Settling | 1 minute |
| 5. Normalization | 1 minute |

Return to step 1

As seen in FIG. 8, dirty water is pumped by a feed pump (not shown) from the dirty water source, through the inlet pipe 54 near the top of the vessel 12. The water flows down through the media bed, then out through the bottom conical wire screen 34 where solids are trapped and remain in the media bed and the clean water exits down through the clean water outlet valve 58. The filtration modes will be controlled by a timer which can be set to accompany different types of water contaminants. If the water is much more contaminated than well water, the filtration sequence will have to be of much shorter duration, and the media bed rejuvenated more often. If the water contains low amounts of solids, the filtration time can be extended because rejuvenation and discharge will not be needed quite as often.

As seen in FIG. 9, when the time has elapsed for the filtration mode, or when the pressure drop across the bed has unduly increased, the valve 58 (outlet for clean water) will shut off and no more dirty water will enter the vessel through the inlet pipe. The fluidization pump 20 will turn on and begin pulling the water and media up through the top of it by suction. The water and media will flow down the nozzle 28 and back out into the vessel as seen at 32 in FIG. 1, for example. By running the water down through the middle of the vessel, it will be directed onto the conical screen and flow down the sides thereof and thereafter hit the side of the vessel and then flow back up to the pump intake. This flow will form what is known as a toroidal flow path. The fluidization mode will last 15 seconds to assure that the bed has formed into a toroid for mixing.

In FIG. 10, once the bed has been fluidized, the discharge outlet valve 52 (of FIG. 1) will now be opened and the pump 20 will remain turned on to continuously mix and scrub the bed. The conical screen which previously served as a media support in the filtration mode will now take on a new task of cleaning the media. This unique method of utilizing one screen as a dual-function apparatus is an object of this invention. The conical screen will now act as a separator. It will hold back the media, but the unwanted solids, dirt, and other contaminants will be washed through the screen openings, down through the outlet discharge valve 52 (of FIG. 1), and transported to the discharge (backwash). Discharge time may be only twelve minutes under normal water filtering conditions.

In FIG. 11, once the discharge is complete, the outlet discharge valve 52 (of FIG. 1) will close and the fluidization pump will turn off. This allows the media to gravitate back onto and around the conical screen to form a rejuvenated bed. The time allowed for settling is about one minute.

In FIG. 12, once the bed has settled, the filter control 62 (of FIG. 1) will move the system into a pre-filter or normalizing step. This is achieved by opening the outlet discharge valve 52 (of FIG. 1) in order that the extra water and solids can flow out through the discharge valve and thereby prepare the bed for another filtration cycle. At the end of this normalization step, the valve 58 will open, allowing clean water to be transported to wherever it is needed once the filtration begins again, then valve 52 will be closed.

The control panel 62 can be a computer which is programmed to switch the variables of the system to achieve various modes of operation in accordance with the desired program selected for a specific filter operation. On the other hand, the control panel 62 can be equipped with a cam-timer which will control the above filtration sequence. The timer will control the opening and closing of the two actuated valves 52 and 58; and, the pump will be turned off and on by the panel.

The filter media used will be crushed pecan shells for a tight packing for efficient filtration. English walnut shells can be added for a somewhat looser packing and to improve the life of the media and wear on the vessel. It is also possible to use any mixture of the following materials: crushed walnut hulls, crushed pecan hulls, and crushed apricot hulls.

Reference is made to my previous U.S. Pat. No. 4,496,464 for the pump horsepower, vessel diameter and length, and the amount of filter media a typical filter installation may require.

In FIG. 2, there is a small amount of filter media traveling outside the vessel during the cleaning or scrubbing step. Such an operation nevertheless is considered to fall within the claimed language "scrubbing the media while the media is contained within the vessel".

I claim:

1. Method of removing suspended contaminants from a liquid comprising the steps of:
   (1) arranging a screen means within the interior of a vessel to divide the vessel into chambers;
   (2) partially filling the interior of the vessel with a filter media which is located upstream of said screen means; said media being made of individual pieces of filter material having an average size which is greater than the size of the openings in said screen means;
   (3) carrying out a filtration step by flowing liquid containing suspended contaminants therein into the upper end of the vessel and forcing the liquid to flow through the media, through the screen means, and then away from the vessel, thereby removing a significant quantity of the contaminants from the liquid and depositing the removed contaminants onto the media;
   (4) carrying out a fluidization step by discontinuing step (3) and then scrubbing a substantial quantity of the deposited contaminants from the media by flowing a relatively large stream of the liquid contained within the vessel along a flow path within the vessel to cause the media to become fluidized and suspended within the liquid, and which thereby transfers the contaminants from the media into the liquid;
   (5) carrying out a discharge step by flowing the contaminants laden liquid through said screen means and along the same flow path followed during step (3) while circulating relatively clean liquid through the vessel;

(6) setting the scrubbed media to the location upstream of the screen means;

(7) normalizing the filter bed by circulating relatively clean liquid through the vessel;

(8) and than resuming the filterng operation of step (3).

2. The method of claim 1 and further including the steps of:

carrying out the scrubbing step while make-up liquid is added to the vessel at substantially the same rate that the concentrated contaminated liquid is removed through the screen means;

discontinuing the flow of make-up liquid to enable the contents of the vessel to be dormant while the media gravitates to the bottom of the vessel; flowing liquid in a closed circuit which includes the vessel; and thereafter repeating step (3).

3. A filter system for removing contaminants from a liquid flowing through the system comprising a vessel having an inlet for providing a contaminated liquid flow into one end thereof and an outlet through which filtered liquid can exit the vessel;

a screen means supported adjacent said outlet and within the vessel; a quantity of particulated filter media contained within said vessel in supported relationship respective to the screen means;

a scrubber apparatus contained within the interior of said vessel by which the filter media can be fluidized and thereby cleaned without removing the media from the vessel; said scrubber apparatus includes a pump means having a suction and a nozzle;

said suction has an inlet which is located to receive flow of liquid from the interior of said vessel; said nozzle and screen means are aligned in a manner whereby liquid and filter media can be fluidized and made to assume a toroidal flow path which scrubs the media and translocates the removed contaminants from the media into the liquid so that the contaminants can be removed from the vessel; and means for removing liquid containing contaminants scrubbed from said particulate filter media from said vessel through said screen and said vessel outlet; said filter media includes a mixture of crushed pecan and walnut hulls.

4. The filter system of claim 3 wherein said contaminated liquid inlet, filtered liquid outlet, and nozzle include means by which there is provided a filtering circuit by which contaminants are removed from the liquid flowing into the vessel, a closed fluidization scrubber circuit by which the removed contaminants are subsequently scrubbed from the filter media, a discharge circuit by which the removed contaminants are expelled from the vessel, a settling interval, and a normalization circuit.

5. The filter system of claim 3 and further including means by which the contaminated liquid is flowed through said screen means while make-up water is being added to the vessel;

and means by which the cleaned filter media thereafter is formed into a filter bed whereupon the filter system can resume removing contaminants from a liquid flowing through the system.

6. The filter system of claim 3 wherein valve means is connected to said vessel and is actuated to cause make-up water to enter the vessel while contaminated water exits the vessel; and, thereafter said valve means is actuated to return the filter media to its bed and to remove the residual liquid contained within the filter system.

7. Method of filtering contaminants from a stream of fluid comprising the steps of:

(1) separating a vessel into upper and lower chambers by mounting a screen means in spaced relation respective to the opposed ends of the vessel; there being a longitudinal central axis for said vessel; said screen means having an apex which lies along the longitudinal central axis of said vessel;

(2) placing a filter media upstream of said screen means and within said vessel, said filter media being made of a multiplicity of discrete pieces of filter material which substantially will not pass through said screen means;

(3) flowing contaminated liquid into the vessel, through the media, through the screen means, and away from the vessel, while the contaminant is deposited on the media;

(4) cleaning the media of most of the deposited contaminants while the media remains within the vessel by carrying out the following steps:

(a) placing the suction of a pump in communication with the liquid contained within the vessel;

(b) placing the discharge of said pump within the vessel in spaced relationshp respective to said pump suction;

(c) flowing liquid contained within said vessel into said pump suction, through said pump discharge, and across said screen means at a rate to cause substantially all of the liquid and the media to be agitated with great force, thereby scrubbing the media while the media is contained within said vessel, and causing most of the contaminants to be translocated from the media into the liquid;

(d) arranging said screen means, pump outlet, and pump inlet respective to one another to cause the fluidized bed to assume the form of a toroid during the cleaning steps;

(e) discharging the liquid ladened with contaminants through said screen means and from the vessel while flowing relatively uncontaminated liquid into the vessel until most of the suspended contaminants have been removed from the vessel;

(5) reducing the velocity of flow to a value which enables the media to settle into a filter bed;

(6) repeating step (3).

8. The method of claim 7 wherein said filtering step (3) is followed by the scrubbing step (4c), which is followed by the discharge step (4e), settling step (5), and thereafter the bed is allowed to settle during a normalization step.

9. The method of claim 7 wherein the screen is in the form of a polygon having an apex which lies along the central axis of the vessel.

10. The method of claim 7 wherein said screen is a pyramid.

11. The method of claim 7 wherein said screen is a cone.

12. The method of claim 7 wherein said filter media is a mixture which includes at least 50% pecan hulls and at least 10% walnut hulls.

13. Method of filtering contaminants from a stream of fluid comprising the steps of:

(1) placing a screen means within a vessel through which liquid can flow;
(2) placing a filter media upstream of said screen means and within said vessel, making said filter media of a multiplicity of discrete pieces of filter material which includes at least 50% pecan hulls and at least 10% walnut hulls, and which substantially will not pass through said screen means;
(3) flowing contaminated liquid into the vessel, through the media, through the screen means, and away from the vessel, while the contaminant is deposited on the media;
(4) cleaning the media of most of the deposited contaminants while the media remains within the vessel by carrying out the following steps;
  (a) placing the suction of a pump in communication with the liquid contained within the vessel;
  (b) placing the discharge of said pump within the vessel in spaced relationship respective to said pump suction;
  (c) flowing liquid contained within said vessel into said pump suction, through said pump discharge, and across said screen means at a rate to cause substantially all of the liquid and the media contained within the vessel to be agitated with great force, thereby scrubbing the media while the media is contained within said vessel, and causing most of the contaminants to be translocated from the media into the liquid;
  (d) discharging the liquid ladened with contaminants through said screen means and from the vessel while flowing relatively uncontaminated liquid into the vessel until most of the suspended contaminants have been removed from the vessel;
(5) reducing the velocity of flow to a value which enables the media to settle into the filter bed;
(6) repeating step (3).

14. The method of claim 13 and further including the step of arranging the pump outlet axially respective to the interior of the vessel and flowing the liquid and media along a path which described a toroid, with the inside of the toroid being formed by the pump discharge.

15. The method of claim 13 wherein the screen is in the form of a polygon having an apex which lies along the central axis of the vessel.

16. The method of claim 13 wherein said screen is a pyramid.

17. The method of claim 13 wherein said screen is a cone.

18. Method of filtering contaminants from a liquid, comprising the steps of:
(1) enclosing a filter media within one end portion of a vessel, using the other end portion of the vessel for containing a liquid;
(2) placing a screen means within said one end of the vessel and supporting most of the media upstream of the screen means, said screen means is of a size to substantially preclude the media from passing therethrough;
(3) flowing contaminated liquid into said other end of the vessel and conducting the flow through the filter media, through the screen means, and away from the vessel while the contaminant is deposited on the media;
(4) carrying out step (3) until the load of the contaminants removed by the filter media produces a pressure drop across the filter media which is significantly greater than the pressure drop at the commencement of step (3);
(5) fluidizing the contaminants and filter media by flowing the liquid contained within the vessel along a toroidal path within the vessel by placing a nozzle means in spaced relationship respective to the screen means, aligning the nozzle means and screen means with respect to one another, while directing flow from the nozzle means towards said end portion of the vessel; and scrubbing the contaminants from the filter media;
(6) flowing a relatively clean liquid into the vessel, through the screen means, and away from the vessel until most of the suspended contaminants have been removed from the liquid contained within the vessel, thereby leaving the scrubbed media and relatively clean liquid within the vessel;
(7) carrying out steps (5) and (6) while make-up liquid is added to the vessel at substantially the same rate that the concentrated contaminated liquid is removed through the screen means;
(8) redepositing the scrubbed media in said one end of the vessel by discontinuing the flow of make-up liquid to enable the contents of the vessel to become dormant as the media gravitates to the bottom of the vessel; and then flowing liquid in a closed circuit which includes the vessel; and thereafter repeating step (3).

19. Method of filtering contaminants from a liquid, comprising the steps of:
(1) enclosing a filter media comprised of a mixture of crushed pecan hulls and crushed walnut hulls within one end portion of a vessel, using the other end portion of the vessel for containing a liquid;
(2) placing a screen means within said one end of the vessel and supporting most of the media upstream of the screen means, said screen means have openings formed therein which are of a size to substantially preclude the media from passing therethrough while admitting the contaminants and liquid to flow therethrough;
(3) flowing contaminated liquid into said other end of the vessel and conducting the flow through the filter media, through the screen means, and away from the vessel while the contaminant is deposited on the media;
(4) carrying out step (3) until the load of the contaminants removed by the filter media produces a pressure drop across the filter media which is significantly greater than the pressure drop at the commencement of step (3);
(5) fluidizing the contaminants and filter media by flowing the liquid contained within the vessel along a toroidal path within the vessel by placing a nozzle means in spaced relation respective to the screen means, aligning the nozzle means and screen means with respect to one another, while directing flow from the nozzle means towards said one end portion of the vessel; and scrubbing the contaminants from the filter media; and, at the same time, flowing a relatively clean liquid into the vessel so that a contaminant laden liquid is forced through the screen means, and away from the vessel until most of the suspended contaminants have been removed from the fluidized material contained within the vessel, thereby leaving the scrubbed media within the vessel;

(6) redepositing the scrubbed media in said one end of the vessel, and then repeating step (3).

20. Method of filtering contaminants from a liquid, comprising the steps of:
    (1) enclosing a filter media within one end portion of a vessel, using the other end portion of the vessel for containing a liquid;
    (2) placing a screen means within said one end of the vessel and supporting most of the media upstream of the screen means, said screen means has openings therein which are of a size to substantially preclude the media from passing therethrough;
    (3) flowing contaminated liquid into said other end of the vessel and conducting the flow through the filter media, through the screen means, and away from the vessel while the contaminant is deposited on the media;
    (4) carrying out step (3) until the load of the contaminant removed by the filter media produces a pressure drop across the filter media which is significantly greater than the pressure drop at the commencement of step (3);
    (5) fluidizing the contaminants and filter media by flowing the liquid contained within the vessel along a toroidal path within the vessel by placing a nozzle means in spaced relation respective to the screen means, aligning the nozzle means and screen means with respect to one another, while directing flow from the nozzle means towards said one end portion of the vessel; and scrubbing the contaminants from the filter media; and, at the same time, flowing relatively clean liquid into the vessel while forcing contaminant laden liquid through the screen means, and away from the vessel until most of the suspended contaminants have been removed from the fluidized material contained within the vessel, thereby leaving the scrubbed media within the vessel;
    (6) redepositing the scrubbed media in said one end of the vessel, and then repeating step (3).

21. A filter system for removing contaminants from a liquid flowing through the system comprising a vessel having an inlet for providing a contaminated liquid flow into one end thereof and an outlet through which filter liquid can exit said vessel;
    a screen supported adjacent said outlet and within said vessel;
    a quantity of particulate filter media in said vessel and being supported on said screen for normal filter operation wherein contaminants are captured by said particulate filter media and filtered liquid exits through said screen and said outlet; and,
    an intermittently operable scrubber apparatus connected to the interior of said vessel such that said particulate filter media can be fluidized and thereby cleaned without removing said particulate filter media from said vessel, said scrubber apparatus including:
    a pump means having a suction inlet in said vessel for receiving flow of liquid from the interior of said vessel and a pump outlet nozzle in said vessel directed toward said screen, said pump outlet nozzle being aligned in a manner such that said particulate filter media fluidized in said liquid assumes a toroidal flow path which scrubs the particulate filter media and translocates removed contaminants from the particulate filter media into the liquid; and means for removing liquid containing contaminants scrubbed from said particulate filter media from said vessel through said screen and said vessel outlet.

22. The filter system of claim 21 in which said screen has a central apex facing said pump outlet nozzle and wherein said screen apex and said pump outlet nozzle lie along a longitudinal central axis of said vessel.

23. The filter system of claim 22 in which said screen is in the form of a pyramid.

24. The filter system of claim 22 in which said screen is in the form of a hemisphere.

* * * * *

UNITED STATES PATENT AND TRADEMARK OFFICE
CERTIFICATE OF CORRECTION

PATENT NO. : 4,787,987

DATED : November 29, 1988

INVENTOR(S) : CLIFFORD J. HENSLEY

It is certified that error appears in the above-identified patent and that said Letters Patent is hereby corrected as shown below:

Column 2, line 50, substitute --clean-- for "clear";
        Line 64, delete the "a" before pecan;

Column 4, line 52, substitute --a 0.015-- for "0.015 a";
Column 7, line 4, substitute --settling-- for "setting";
Column 9, line 42, substitute --describes-- for "described";
Column 12, line 4, substitute --filtered-- for "filter".

Signed and Sealed this

Twenty-seventh Day of June, 1989

Attest:

DONALD J. QUIGG

Attesting Officer

Commissioner of Patents and Trademarks